United States Patent

[11] 3,590,954

| [72] | Inventor | Ronald S. Plantan<br>Wickliffe, Ohio |
|---|---|---|
| [21] | Appl. No. | 882,593 |
| [22] | Filed | Dec. 5, 1969 |
| [45] | Patented | July 6, 1971 |
| [73] | Assignee | White Motor Corporation<br>Cleveland, Ohio |

[54] DIFFERENTIAL MECHANISM
20 Claims, 2 Drawing Figs.

[52] U.S. Cl. ........................... 184/6 U,
74/710
[51] Int. Cl. ........................... F16n 7/40
[50] Field of Search........................... 74/710,
467, 710.5; 184/6, 11, 13, 6 Y

[56] References Cited
UNITED STATES PATENTS

| 1,638,228 | 8/1927 | Wolff | 74/710 X |
|---|---|---|---|
| 2,272,416 | 2/1942 | McVoy | 74/711 |
| 2,375,938 | 5/1945 | Moon | 74/711 |
| 2,397,374 | 3/1946 | Schlicksupp | 74/711 |
| 2,400,964 | 5/1946 | Vincent et al. | 184/6 TT |
| 2,638,173 | 5/1953 | Dunham | 184/6 TT |
| 2,861,478 | 11/1958 | Donner | 74/711 |
| 3,040,600 | 6/1962 | Mueller | 184/6 TT (X) |
| 3,441,106 | 4/1969 | Taylor | 184/6 TT |
| 3,448,635 | 6/1969 | Nelson | 74/710.5 |
| 3,495,479 | 2/1970 | Rass | 74/710 |

*Primary Examiner*—Manuel A. Antonakas
*Attorney*—Watts, Hoffmann, Fisher & Heinke ABSTRACT: A motor vehicle having a tandem driven axle in which the driven axles are driven from an interaxle differential mechanism. The interaxle differential mechanism is connected to a positive displacement lubricant pump which pumps lubricant upon differentiation of the interaxle differential mechanism. The discharge of the pump communicates with passageways which direct pumped lubricant to relatively moving parts of the interaxle differential. The pump discharge is throttled by these passageways so that the back pressure of the oil impedes the operation of the pump. The pump is then effective to transmit torque between relatively moving parts of the interaxle differential to limit slipping of the differential.

PATENTED JUL 6 1971  3,590,954

INVENTOR.
RONALD S. PLANTAN

BY Watts, Hoffmann,
Fisher & Heinke
ATTORNEYS.

3,590,954

DIFFERENTIAL MECHANISM

BACKGROUND OF THE INVENTION

1. Field of the Invention

The present invention relates to differential mechanisms and more particularly relates to differential mechanisms in which slipping between driven members associated with the differential mechanism is limited.

2. The Prior Art

Highway tractors and other motor vehicles having tandem driven axles are well known. Typically these vehicles have included differential mechanism for transmitting drive forces to wheels of each driven axle as well as an interaxle differential mechanism through which drive forces are transmitted to the axles. The differentials and the interaxle differential accommodate the different rotational speeds of the various axle shafts which occur when the vehicle corners. Additionally, the interaxle differential mechanism compensates for variations in tire diameters which effect the speeds of the driven axles.

Typically, the interaxle differential mechanism and the differential mechanism of the forward driven axle are located in a common housing or case with the interaxle differential located vertically above the forward axle differential. The vehicle propeller shaft extends to the housing for driving the interaxle differential. One side gear of the interaxle differential is suitably geared to the forward axle differential. A second side gear drives a through shaft which transmits drive to the rear axle differential.

Because the interaxle differential mechanism is located above the forward axle differential, the cases containing these differential mechanisms have been designed to ensure lubrication of the parts of the interaxle differential mechanism. In some cases, lubricant slingers have been provided for splashing lubricant from the bottom of the case onto the interaxle differential. The casings for the differential mechanism have also been provided with lubricant channels and flow grooves so that lubricating oil can be directed to desired locations in the cases and dropped onto the parts of the interaxle differential.

The cases for differential mechanisms which employ such lubricant passageways and channels have been structurally complex and expensive. Furthermore, they have not assured a positive or forced flow of lubricant to the interaxle differential. In some instances, lubricant may not flow at all when it is needed because of high-speed relative rotation of parts in the interaxle differential. This is particularly so when the wheels of the rear driving axle have lost traction and the interaxle differential functions to spin the slipping rear wheels while maintaining the forward axle stationary.

In the past, most motor vehicle differentials have had the disadvantage of disabling a vehicle when a drive wheel has lost traction. Unfortunately, the structure in a typical differential mechanism which enables different rotational speeds of traction wheels when the vehicle corners is the same structure which disables the vehicle when a wheel loses traction.

The prior art has proposed differential mechanisms which freely enable cornering of vehicles but which cease to act as differential mechanisms when relative rotation between input and output members of the differential exceeds a certain speed. These differential mechanisms have become known as "limited slip differentials." In most constructions of the this type, the differential lubricant has, in one way or another, been relied upon to aid in limiting the slip of the parts of the differentials. Some of these mechanisms utilized the differential lubricant to operate slip-limiting clutches. For example, in some proposals, clutches were actuated to drivingly connect relatively moving members of a differential mechanism by viscous forces of the lubricating fluid. Other proposals pumped lubricating fluid when slipping occurred, with the fluid's resistance to pumping retarding the slip between members of the differential mechanism.

The slip-limiting structures of these proposed differential mechanisms relied on an easily accessible and abundant supply of lubricating fluid in order to effectively limit slipping of the differential mechanism. An noted above, interaxle differential mechanisms are generally not located accessible to lubricating fluid in quantities sufficient for operating slip-limitng clutches or pumps. Hence, interaxle differentials are frequently not of the limited slip type.

In a vehicle having a tandem driven axle, it is desirable to provide a limited slip interaxle differential mechanism so that differentiation between the forward and rear axles can be accomplished while the vehicle is cornering, yet which prevents the vehicle from being disabled should one driven wheel, or set of driven wheels, lose traction.

The prior art has thus not provided an interaxle differential mechanism which is: (1) reliably lubricated by a forced flow of lubricant which is delivered whenever slipping occurs; and (2) capable of truly effective limited slip operation.

SUMMARY OF THE INVENTION

The present invention provides a differential mechanism which is positively lubricated when parts of the differential mechanism rotate relative to each other and which is constructed and arranged so that pumping of the lubricant to the differential results in limiting the slip between relatively moving parts of the differential thereby preventing stalling of the vehicle in the event of loss of traction of a wheel or wheels on one driven axle shaft.

In a preferred embodiment of the invention, a vehicle having tandem driven axles is provided with an interaxle differential between the vehicle propeller shaft and the driven axles. Preferably, each axle has an axle differential mechanism for driving each axle shaft. The axle differentials are driven from the interaxle differential mechanism.

The interaxle differential and the forward axle differential are housed in a common case with the interaxle differential disposed vertically above the axle differential. The input shaft projects forwardly from the case and a through shaft extends rearwardly from the case to the rear axle differential. The interaxle differential has one output which drives the front axle differential through a gear train. Its other output drives the rear axle differential via the through shaft.

A positive displacement lubricant pump is connected between input and output members of the interaxle differential. When relative rotation occurs between these input and output members of the interaxle differential the lubricant pump is operated.

The inlet of the pump communicates with a reservoir of lubricating fluid in the case for the interaxle differential mechanism. Because the pump is a positive displacement pump the reservoir need not be adjacent the interaxle differential and the casing need not be specially constructed to channel lubricant to the interaxle differential.

The discharge section of the pump communicates with flow passageways leading to relatively moving parts of the interaxle differential mechanism. These flow passageways throttle the discharge flow of lubricant from the pump. Preferably, shafts of the interaxle differential are formed to provide these flow passages. The through shaft and input shaft cooperate to provide a substantially continuous flow passage for the lubricant which is sufficiently sealed to permit maintenance of back pressure in the pumped lubricant.

Due to the substantially incompressible nature of the lubricating fluid, the pumping action is impeded as the back pressure of fluid in the lubricant passageways increases. As a result, the pump transfers torque from the associated input member to the output member. This limits relative rotation between these members and thus limits slipping of the interaxle differential mechanism.

Accordingly, a principal object of the present invention is the provision of a new and improved differential mechanism utilizing a lubricant pump to produce positive or forced lubrication of relatively moving parts of the differential mechanism when slipping occurs and which is effective to limit slipping between input and output members of the differential mechanism.

Other objects and advantages of the present invention will become apparent from the following detailed description made with reference to the accompanying drawings which form a part of the specification.

DESCRIPTION OF A PREFERRED EMBODIMENT

Figure 1:
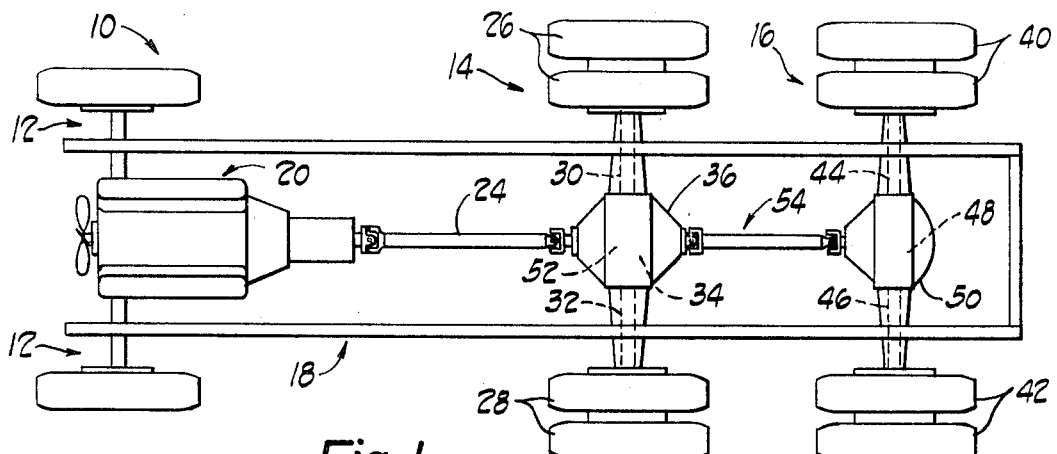
FIG. 1 is a plan view of a portion of a vehicle having tandem driven axles and employing a differential mechanism according to the invention; and, FIG. 2 is a cross-sectional view of a portion of the vehicle shown in FIG. 1.

A portion of a vehicle 10 embodying the present invention is illustrated in FIG. 1. The vehicle 10 includes steerable front wheel and suspension assemblies 12; tandem rear wheel and axle assemblies 14, 16; a frame 18 supported on the assemblies 12, 14, 16; and a prime mover 20 supported by the frame 18.

The prime mover 20 preferably includes an internal combustion engine 22 which drives a propeller shaft 24 through a suitable transmission and clutch. The engine, transmission, clutch and propeller shaft may be of any suitable, conventional construction and accordingly are illustrated only schematically.

The tandem rear wheel and axle assemblies are both driven from the propeller shaft 24. The forward axle assembly 14 includes dual traction wheels 26, 28 extending from opposite sides of the frame 18, and axle shafts 30, 32 which are drivingly connected between the wheels 26, 28 respectively, and a forward axle differential mechanism 34. The axle shafts 30, 32 and the differential 34 are surrounded by a housing or differential case 36.

The rear axle assembly 16 includes dual traction wheels 40, 42 extending from opposite sides of the frame 18 and axle shafts 44, 46 for the traction wheels 40, 42, respectively. The axle shafts 44, 46 extend between the associated traction wheels and a rear axle differential mechanism 48. The axles 44, 46 and the differential 48 are all surrounded by a differential housing or case 50.

Drive is transmitted to the forward and rear axle differentials 34, 48, by an interaxle differential mechanism 52 which is located in the differential case 36 vertically above the forward axle differential mechanism 34. The interaxle differential mechanism 52 includes an input driven by the propeller shaft 24 and two outputs or drive transmissions, each of which drives one of the axle differentials.

The rear axle differential mechanism 48 is driven from the interaxle differential by one of its outputs, which includes a through shaft 54 connected to the rear differential. The forward axle differential 34 is driven from the second output of the interaxle differential through a suitable gear drive (see FIG. 2).

Figure 2:
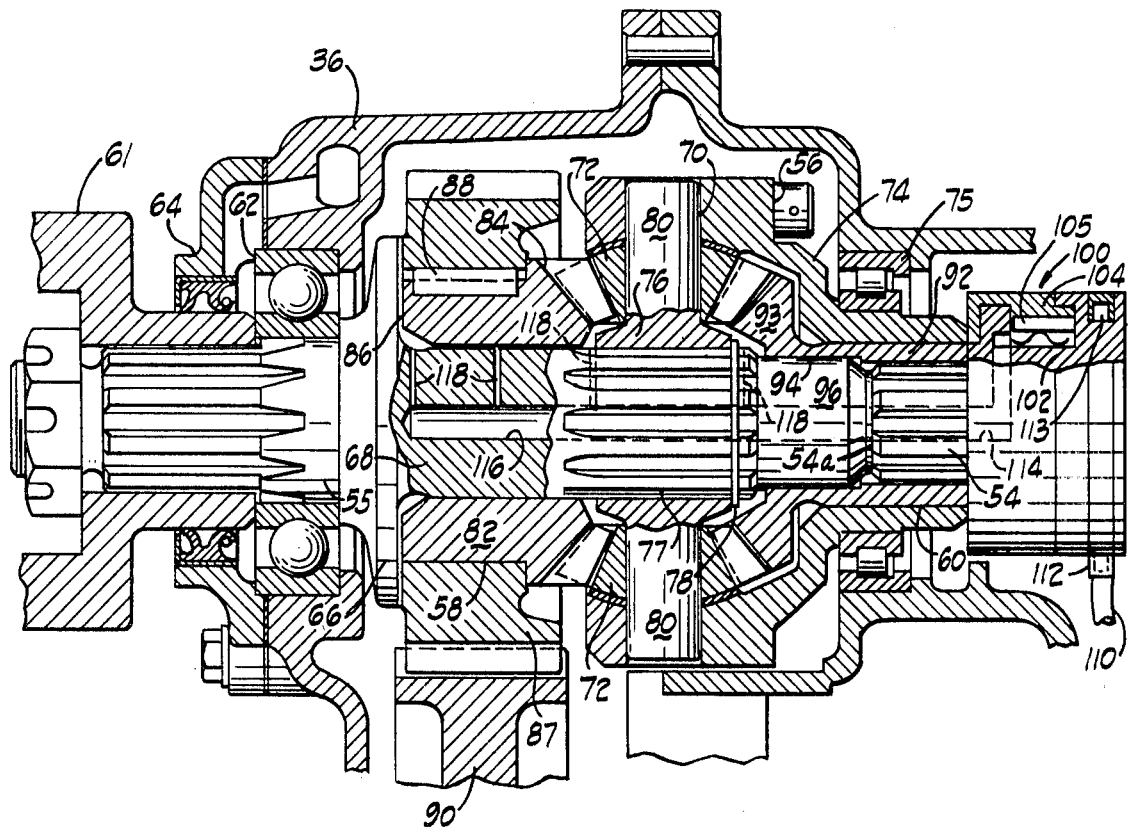

Referring now to FIG. 2, the input of the interaxle differential 52 includes an input shaft 55 and a planet gear carrier assembly 56. The outputs include side gears 58, 60 and are described in greater detail presently.

The input shaft 55 is coupled to the propeller shaft 24 by a universal joint 61 and is rotatably supported in the case 36 by a bearing 62. A seal assembly 64 surrounds the juncture of the case 36 and the input shaft to prevent loss of lubricant from the case. The input shaft 55 includes a radial flange 66 and a projecting portion 68 which extends beyond the flange 66 into the case 36.

The planet gear carrier assembly 56 includes a spider 70, beveled planet gears 72 carried on the spider, and a rotatable cage 74 which is fixed to the spider and rotatably supported in the case 36 by a bearing 75.

The spider 70 includes an annular hub 76 surrounding the input shaft 55. The hub and input shaft are drivingly attached by a spine connection 77. A snap ring 78 maintains the hub axially positioned on the shaft 55. Four cylindrical pins 80 project radially from the hub 76. The projecting ends of the pins are fixed in the cage 74 so that the cage is driven with the input shaft 55. Each planet gear 72 is rotatably disposed about its associated one of the pins 80 between the hub and the cage. The planet gears are freely rotatable on the cylindrical pins.

One output of the interaxle differential, which includes the side gear 58, transmits drive to the forward axle differential 34. The side gear 58 includes a cylindrical sleevelike body 82 surrounding the input shaft 55. The body 82 is rotatable with respect to the input shaft. A toothed bevel gear portion 84 projects from the body 82 with its teeth in mesh with the planet gears 72. An annular end surface 86 of the body slidably engages the radial flange 66 on the input shaft for maintaining the side gear 58 in mesh with the planet gear 72.

An annular spur gear 87 surrounds the body 82 and is fixed to the body by a suitable key and key slot arrangement 88. The gear 87 meshes with an input gear 90 of the forward axle differential mechanism 36. Only a portion of the gear 90 is illustrated.

The second output of the interaxle differential, including the side gear 60 and through shaft 54, transmits drive to the rear axle differential. The side gear 60 includes a cylindrical sleevelike body portion 92 which is splined to the through shaft 54. The body 92 extends beyond the end 54a of the through shaft towards the spider 70. The outer periphery is rotatably supported in the cage 74. A gear-toothed portion 93 projects from the body 92 and includes beveled gear teeth which mesh with the beveled planet gears 72.

The body 92 defines an internal socket 94 which slidably receives the projecting end 96 of the input shaft 55. The end 96 of the shaft 55 is snugly received in the socket 94 yet is freely rotatable with respect to the body. The projecting end 96 of the shaft 55 and the end 54a of the through shaft 54 are disposed closely adjacent each other for a purpose which is described presently.

Operation of the interaxle differential mechanism 52, thus far described, should be apparent. When the wheels of the front and rear axles have traction, the planet gear carrier assembly 56 is driven from the propeller shaft 24. The side gears 58, 60 and their associated members provide substantially equal tooth loads on the planet gears 72 as the planet gear carrier rotates. The tooth loadings are oppositely directed so that the planet gears are stationary relative to the pins 80. Accordingly, the drive from the propeller shaft 24 is divided substantially equally between the front and the rear axle assemblies.

Should one or more wheels of the forward axle assembly lose traction, the torque required by the forward axle is significantly reduced. Thus the resistance to rotation of the side gear 58 is reduced causing the planet gears 72 to rotate with respect to their associated pins as they orbit about the input shaft. This reduces the torque transmitted to the rear axle assembly through the side gear 60 and through shaft 54 to about the level of the torque being provided to the front axle. As a result, the side gear 58 rotates at a greater speed than the input shaft 55, while the side gear 60 tends to stop rotating.

Conversely, should the rear axle assembly lose traction, the resistance to rotation afforded by the side gear 60 is reduced causing the planet gears to rotate about their associated pins. When this occurs, the side gear 60 rotates faster than the input shaft. The side gear 58 then tends to become stationary on the spinning input shaft 55, reducing the power transmitted to the forward axle assembly.

It should be apparent that whenever differentiation occurs, the input shaft spins relative to each of the side gears regardless of which axle assembly has lost traction. This relative rotation between the input and each output of the interaxle differential is referred to as "slip."

Slip likewise occurs when the vehicle corners, although the speeds of relative rotation between the input and outputs of the differential 52 are of relatively low magnitude during cornering. The operation of the differential 52 is the same during cornering as is described above.

In accordance with the present invention, the interaxle differential 52 is equipped with a lubricant pump 100 for providing a forced flow of lubricant to the interaxle differential mechanism when differentiation occurs and which is effective to limit slipping of the interaxle differential. The pump 100 acts to limit slipping between the input and outputs of the interaxle differential mechanism while pumping lubricant.

The pump 100 of the preferred embodiment is of the cam and roller type. The pump may be of any suitable construction or type and accordingly is shown schematically and only briefly described. The illustrated pump 100 includes a roller carrier member 102 splined to the through shaft 54, an annular cam member 104 fixed to the cage 74, and a plurality of rollers 105 disposed between the carrier 102 and the cam member 104. The rollers are preferably spring urged radially outwardly against a cam surface on the cam member.

When the cam member and the roller carrier member rotate with respect to each other, the rollers ride on the cam surface and define pumping chambers between each roller and the carrier. The volume of these chambers changes in accordance with the shape of the cam surface on the cam member.

Inlet and discharge ports are provided in opposite axial end faces of the carrier 102. The inlet port communicates with a lubricant reservoir in the lower portion of the cage 36 by way of a supply conduit 110, a fitting 112 and inlet manifold 113.

The discharge port communicates with lubricant passageways defined by axial bores 114, 116 in the through shaft 54 and input shaft 55, respectively. The bore 114 opens at the end 54a of the through shaft and on the axis of rotation of the through shaft. The bore 116 opens at the end 96 of the input shaft adjacent the bore 114 and extends along the axis of rotation to a location adjacent the plane of the radial flange 66. The ends 54a, 96 of the through and input shafts are spaced apart slightly and the juncture of the shafts is surrounded by the socket 94. The sliding fit of the shaft 55 in the socket is sufficiently close that lubricating fluid does not leak through the socket to any substantial degree.

A number of radial-drilled passages or holes 118 extend from the bore 116 to the exterior of the input shaft 55. These holes are located so that oil which is pumped into the bores 114, 116 is directed radially onto relatively moving parts of the differential mechanism through the holes 118.

The holes 118 restrict the flow of lubricant in the passageways. These holes define a total flow area for the pumped lubricant which is adequately large to enable nearly unrestricted flow of the lubricant to relatively moving parts of the differential when the vehicle 10 is cornering, i.e., when slip speeds of the differential are low and pumped lubricant flow rates are low.

This total flow area of the holes 118 is not sufficient to accommodate the pump discharge flow when slip speeds are high, for example when one axle assembly looses traction. Hence, as slip speeds increase, back pressure at the pump discharge increases, because of flow impedance afforded by the holes 118. Since the lubricating fluid is substantially incompressible, the pumping action of the rollers is strongly resisted. This is due to the rollers' inability to force lubricant from the pumping chambers when the back pressure at the discharge is high. The rollers thus force the cam member 104 to tend to assume the same rotational speed as that of the through shaft. Accordingly, torque is transmitted between the roller carrier and the cam member of the pump through the rollers. The amount of torque transferred increases proportionally with the magnitude of the back pressure.

Since the roller carrier and cam members of the pump are rigidly connected to the through shaft 54 and cage 74, the transmission of torque through the pump 100 limits the slip between the cage 74 and the through shaft 54 regardless of which axle assembly has lost traction. In effect, the interaxle differential is "locked up" at a particular slip speed in that it no longer functions as a differential mechanism. As a result, the wheels of the axle which have traction are driven to move the vehicle upon "locking up" of the interaxle differential.

It can now be seen that a new and improved differential mechanism has been provided and that the objects heretofore enumerated and others have been accomplished. While a preferred embodiment of the invention has been illustrated and described in detail, the invention is not to be considered limited to the precise constructions shown.

What I claim is:

1. In a vehicle having driven tandem axles, an interaxle differential mechanism for transmitting drive to said driven axles from a propeller shaft of the vehicle comprising:
   a. a planet gear carrier assembly driven by said propeller shaft including planet gears carried by a carrier member;
   b. a drive train for one driven axle including a first side gear meshing with said planet gears;
   c. a drive train for the other driven axle including a second side gear meshing with said planet gears;
   d. a lubricant pump drivingly connected between said carrier assembly and the drive train for one of said axles, said pump operative to direct lubricant to parts of said differential mechanism in response to slipping of said differential mechanism;
   e. means for restricting flow of pumped lubricant from said pump to said parts whereby lubricant back pressure impedes operation of said pump; and,
   f. said pump transferring torque between said carrier assembly and said one drive train when slipping occurs to limit slipping of said differential mechanism while pumping lubricant to said parts.

2. A differential mechanism as claimed in claim 1 wherein said planet gear carrier assembly includes an input shaft for driving said planet carrier member, said input shaft supporting said first side gear for relative rotation, said flow restricting means including at least a lubricant passageway in said input shaft for directing lubricant between said first side gear and said input shaft.

3. A differential mechanism as claimed in claim 2 wherein said passageway includes an axial opening in said input shaft and a plurality of radial passages communicating said axial opening to the exterior of said input shaft.

4. A differential mechanism as claimed in claim 3 wherein the drive to which said pump is connected further includes an output shaft member supporting one of said side gears, said output shaft including an axial opening communicating with said axial opening in said input shaft, said pump directing discharge lubricant into said axial opening in said output shaft.

5. A differential mechanism as claimed in claim 4 wherein said input and output shafts have a common axis of rotation and said axial openings extend along said axis of rotation.

6. A differential mechanism as claimed in claim 5 wherein ends of said input and output shafts are adjacent each other and said openings in said shafts extend from said ends, and a surface bridges said ends of said shafts for confining lubricant between said shaft ends whereby pumped lubricant is forced into the opening in said input shaft.

7. A differential mechanism as claimed in claim 6 wherein said surface is formed in a socket defined by the side gear carried by said output shaft, said socket snugly receiving said input shaft and rotatable with respect to said input shaft.

8. In a vehicle as claimed in claim 1 wherein said driven tandem axles each includes an axle differential mechanism driven by said interaxle differential mechanism, one of said axle differential mechanisms and said interaxle differential mechanism located in a common case with said interaxle differential vertically above said axle differential.

9. In a vehicle as claimed in claim 8 wherein said case defines a lubricant reservoir remote from said interaxle differential, an inlet of said pump communicating with said reservoir through an inlet flow passageway extending to said reservoir from said pump.

10. A differential mechanism as claimed in claim 2 wherein said input and output shafts coextend along a common axis of rotation, each of said shafts defining axially extending holes opening at adjacent ends of said shafts, said pump having its discharge communicating with the axial opening in said output shaft for directing pumped lubricant into said holes, in said input and output shafts.

11. A differential mechanism as claimed in claim 10 wherein said pump includes a first part fixed to said output shaft and a second part fixed to said planet carrier member, said first and second pump parts effecting pumping of lubricant when relative rotation between them occurs.

12. A differential mechanism comprising:
a. a power input shaft;
b. a planet gear carrier assembly fixed to said input shaft;
c. a first output drive transmission including a side gear rotatably supported on said input shaft adjacent said planet gear carrier assembly;
d. a second output drive transmission including a second side gear fixed to an output shaft;
e. a positive displacement lubricant pump connected between said planet gear carrier assembly and one of said drive transmission, said pump operating to pump lubricant only when slip occurs between said planet gear carrier assembly and said one drive transmission; and,
f. lubricant directing means communicating the discharge from said pump to relatively moving parts of said differential mechanism, said lubricant-directing means including a lubricant passageway in said input shaft and a plurality of passages for directing pumped lubricant from said passageway to said relatively moving parts.

13. A differential as claimed in claim 12 wherein said passageway in said input shaft opens at one end thereof, said end of said input shaft rotatably received in a socket defined by said second side gear, said socket closely surrounding said input shaft and minimizing the flow of lubricant between said input shaft and said socket.

14. A differential as claimed in claim 13 and further including a second passage for directing pumped lubricant into said first passage through said end of said input shaft.

15. A differential as claimed in claim 14 wherein said second passage is defined in said output shaft, said input and output shafts aligned with said end of said input shaft disposed closely adjacent an end of said output shaft.

16. A differential as claimed in claim 12 wherein said lubricant-directing means includes at least a flow restricting portion to restrict the flow of lubricant to said parts of said differential and create back pressure for impeding operation of said pump.

17. A differential as claimed in claim 16 wherein said pump includes a first member fixed to said one drive transmission, a second member fixed to said planet gear carrier assembly, said first and second pump members moved relative to each other to effect pumping lubricant in proportion to slipping of said differential, said lubricant back pressure retarding relative rotation between said pump members whereby torque is transmitted between said planet carrier assembly and said one drive transmission to limit slipping of said differential.

18. In a differential mechanism:
a. an input drive comprising a propeller shaft and a planetary gear assembly;
b. a pair of output drives comprising output drive gears meshing with gears of said planetary assembly and driven members connected to respective output drive gears;
c. a lubricant pump connected between said input drive and one output drive for pumping lubricant only when said differential mechanism slips;
d. at least one lubricant-directing passageway extending from an outlet of said pump to parts of said differential mechanism which move relative to each other when said differential mechanism slips whereby said relatively moving parts are lubricated when said differential slips; and,
e. said at least one passageway restricting flow of lubricant therethrough from said pump at differential slip speeds above a given speed whereby the back pressure on said pump is increased and slipping between said input drive and said one output drive is retarded by said lubricant pump.

19. The differential mechanism claimed in claim 18 wherein said lubricant pump is a positive displacement pump and said at least one passageway is defined by openings in said propeller shaft and a driven member of one of said output drives.

20. The differential mechanism claimed in claim 19 wherein said pump comprises a first pump member connected to said planetary gear assembly for rotation therewith, a second pump member connected to one of said output drive gears for rotation therewith, and an outlet communicating with said at least one passageway, said pump operative to pump lubricant through said outlet when said first and second pump members rotate relative to each other.